US011979707B1

(12) United States Patent
Curd et al.

(10) Patent No.: US 11,979,707 B1
(45) Date of Patent: May 7, 2024

(54) SYSTEM AND METHOD FOR AN AUDIO REPRODUCTION DEVICE

(71) Applicant: SCAEVA TECHNOLOGIES, INC., Gilroy, CA (US)

(72) Inventors: Steven E. Curd, Gilroy, CA (US); Wendy S. Curd, Gilroy, CA (US)

(73) Assignee: Scaeva Technologies, Inc, Gilroy, CA (US)

( * ) Notice: Subject to any disclaimer, the term of this patent is extended or adjusted under 35 U.S.C. 154(b) by 0 days.

(21) Appl. No.: 17/988,719

(22) Filed: Nov. 16, 2022

Related U.S. Application Data

(63) Continuation of application No. 17/383,337, filed on Jul. 22, 2021, now abandoned.

(60) Provisional application No. 63/055,256, filed on Jul. 22, 2020.

(51) Int. Cl.
*H04R 1/28* (2006.01)
*H04R 5/033* (2006.01)
*H04R 7/04* (2006.01)

(52) U.S. Cl.
CPC ........... *H04R 1/2834* (2013.01); *H04R 5/033* (2013.01); *H04R 7/04* (2013.01)

(58) Field of Classification Search
None
See application file for complete search history.

(56) References Cited

U.S. PATENT DOCUMENTS

2017/0006373 A1* 1/2017 Bruss .................. H04R 1/2849
2021/0377649 A1* 12/2021 Lewis .................. H04R 1/1008

* cited by examiner

*Primary Examiner* — Kenny H Truong
(74) *Attorney, Agent, or Firm* — Minisandram Law Firm; Raghunath S. Minisandram

(57) ABSTRACT

An audio reproduction device is disclosed. The audio reproduction device includes a housing, a driver assembly including a diaphragm, an ear cushion and at least one port. The diaphragm selectively vibrates based on a received audio input signal. The diaphragm has a front side and a back side. The driver assembly is disposed in the housing, with selective portion of the housing and the driver assembly define a housing chamber, the housing chamber disposed behind the back side of the diaphragm. The ear cushion surrounds the diaphragm and selective portion of the ear cushion forms an ear chamber, the ear chamber disposed in front of the front side of the diaphragm. The at least one port is configured to communicate with the housing chamber and selectively relieve pressure from the housing chamber and into the ear cushion, when the diaphragm selectively vibrates.

9 Claims, 5 Drawing Sheets

SYSTEM AND METHOD FOR AN AUDIO REPRODUCTION DEVICE

CROSS-REFERENCE TO RELATED APPLICATIONS

This application is a continuation application of and claims priority to patent application Ser. No. 17/383,337 filed on Jul. 22, 2021, entitled "SYSTEM AND METHOD FOR AN AUDIO REPRODUCTION DEVICE", which application claims priority to provisional patent application No. 63/055,256 filed on Jul. 22, 2020, entitled "SYSTEM AND METHOD FOR AN AUDIO REPRODUCTION DEVICE". Contents of application No. 63/055,256 is incorporated herein by reference, in its entirety. Contents of application Ser. No. 17/383,337 is also incorporated herein by reference, in its entirety.

TECHNICAL FIELD

The present invention relates generally to an audio reproduction device, and, more particularly, to a headphone or similar listening device such as an earphone or ear buds.

DESCRIPTION OF RELATED ART

Audio sound reproduction devices may include headphones and earbuds. For stereo headphones to sound as natural and accurate as possible, it is desirable that they perform acceptably throughout the range of a human's perception. Typically specified as 20 Hz to 20 kHz, this audible spectrum is the focus of most audio reproduction devices, including headphones.

The perception of sound results from alternating vibrations, or waves, of increased air pressure (crest) and decreased air pressure (trough). Sound waves travel at a speed of approximately 343 meters/second at room temperature and atmospheric pressure (commonly known as the phase speed). The distance between two crests or troughs is known as the wavelength and is represented as $\lambda=v/f$, where $\lambda$=wavelength, v=phase speed of the wave, and f=frequency. From this equation, we can compute the wavelength of a 20 kHz sound wave as: $\lambda=343/20{,}000=17$ mm. And, we compute the wavelength of a 20 Hz sound wave as: $\lambda=343/20=17$ m=17,000 mm.

From this, we notice that a 20 Hz sound has a wavelength that is 1000 times greater than that of a 20 kHz sound. Due to this significant longer wavelength, it is a challenge for small drivers in a audio reproduction device to reproduce lower frequency sounds. This is due partly to the physical volume of air that must be moved for the sound to be audible. At 20 Hz, 1000 times more air volume must be moved to create a wave of equivalent amplitude to that of a 20 kHz wave.

Further, perceived loudness of a sound heavily depends upon its frequency. An average human's sensitivity to sound peaks around 2-4 kHz, considered to be in the middle of the voice frequency band. Below 200 Hz, hearing sensitivity drops. For example, a 125 Hz tone requires about 20 dB greater sound pressure to be perceived to be as loud as a 1000 Hz tone. This places additional demands on the reproduction of lower frequencies.

There is a need to solve one or more of these problems, to improve the sound reproduction of lower frequencies. It is with these needs in mind, this disclosure arises.

SUMMARY OF THE INVENTION

In one embodiment, an audio reproduction device is disclosed. The audio reproduction device includes a housing, a driver assembly including a diaphragm, an ear cushion and at least one port. The diaphragm selectively vibrates based on a received audio input signal. The diaphragm has a front side and a back side. The driver assembly is disposed in the housing, with selective portion of the housing and the driver assembly define a housing chamber, the housing chamber disposed behind the back side of the diaphragm. The ear cushion surrounds the front side of the diaphragm and selective portion of the ear cushion forms an ear chamber, the ear chamber disposed in front of the front side of the diaphragm. At least one port is configured to communicate with the housing chamber and selectively relieve pressure from the housing chamber and into the ear cushion, when the diaphragm selectively vibrates.

This brief summary has been provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are now described with reference to the drawings. In the drawings, the same components have the same reference numerals. The illustrated embodiments are intended to illustrate but not limit the invention. The drawings include the following Figures.

DETAILED DESCRIPTION

Figure 1:
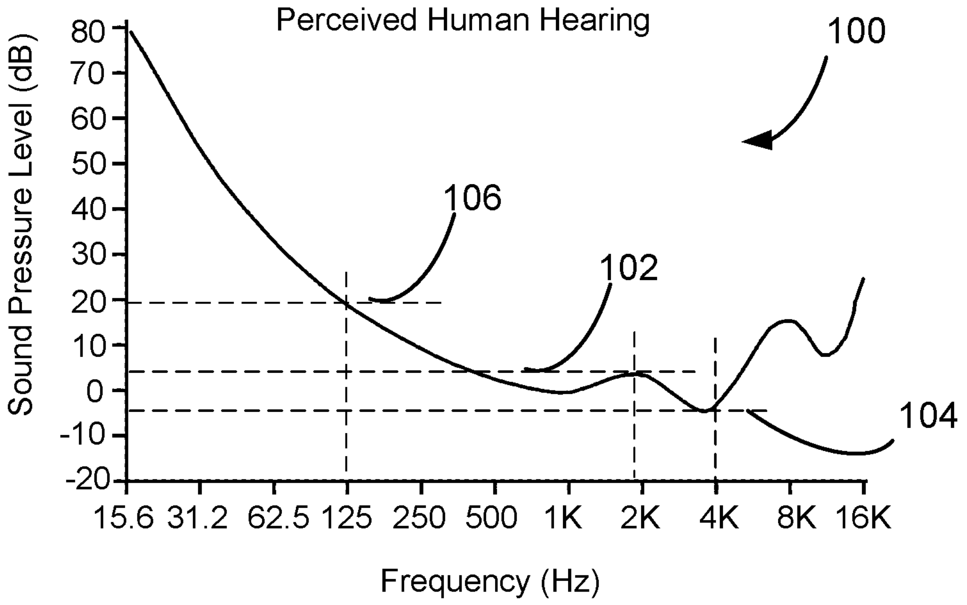
FIG. 1 shows a graph with sound pressure level required to perceive sound at various frequencies by an average human's ear, according an example of this disclosure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose an audio reproduction device. Referring now to the drawings, where similar reference characters denote corresponding features consistently throughout the figures, various examples of this disclosure is described.

Referring to FIG. 1, graph 100 shows sound pressure level (dB) required to perceive sound at various frequencies by an average human's ear. Sensitivity to sound peaks around 2-4 kHz, considered to be in the middle of the voice frequency band, with a sound pressure level between about +5 dB to −5 dB, as shown by lines 102 and 104. Below 200 Hz, hearing sensitivity drops. For example, referring to line 106, a 125 Hz tone requires about 20 dB greater sound pressure to be perceived to be as loud as a 1 KHz tone. This places additional demands on the reproduction of lower frequencies by a audio reproduction device.

Since the surface area of a circle is defined as:

$$A=\pi r2, \text{ or } A=\pi(d/2)2 \qquad \text{Equation 1}$$

Where A=area, r=radius, and d=diameter

Given this, a 38 cm (15 inch) diameter circular subwoofer cone has a surface area of approximately 1,100 $cm^2$. Whereas a 2.5 cm (1 inch) diameter circular tweeter has a surface area of only 5 $cm^2$. This significant difference enables the subwoofer to move a considerably greater volume of air as required for low frequencies to be audible.

Since headphones rest on or near the listener's head, physical constraints eliminate the possibility of utilizing large drivers to represent lower frequencies. With a perfect air seal between the driver and the listener's ear, a defined volume of air can be effectively trapped within this finite space. This explains how in-ear buds can represent some low frequencies even while utilizing very small drivers: the volume of air trapped between the driver and the eardrum is also very small, enabling the perception of low frequencies while moving a small amount of air.

For over-ear headphones, the acoustic environment becomes more complex. A larger volume of air is trapped, provided there is a reliable seal, or interface, between the headphone ear cushions and the listener's head. However, a somewhat larger physical driver can also be utilized, since it is deployed outside of the ear area. Most over-ear headphones utilize drivers that range from 20 mm to 50 mm in diameter, providing surface areas of 314-2,000 $mm^2$. With a driver of this limited size, bass response of over-the-ear headphones is highly dependent upon the amount of trapped air, which in turn is highly sensitive to the interface between the ear cushions and the listener's head. Achieving this optimal interface is a challenge in achieving repeatably consistent performance in the bass, or lower, frequencies.

Additionally, as the diaphragm within the driver moves alternatingly toward and away from the listener, it creates the sound pressure waves which are perceived as sound. As the diaphragm moves toward the listener, it creates higher pressure on its front surface. However, it simultaneously creates a lower pressure on its obverse surface. In most headphones, this backpressure is often discarded by either being vented to the outside or by being trapped within the structure of the headphone ear cup. This disclosure addresses both of these challenges to enable over-ear headphones to delivery consistent and accurate low frequency response by repurposing the air waves behind the driver diaphragm. By capturing these otherwise useless air waves and routing them into the ear cushion space, they serve to enhance the listener's perception of low frequency sounds.

Figure 2:
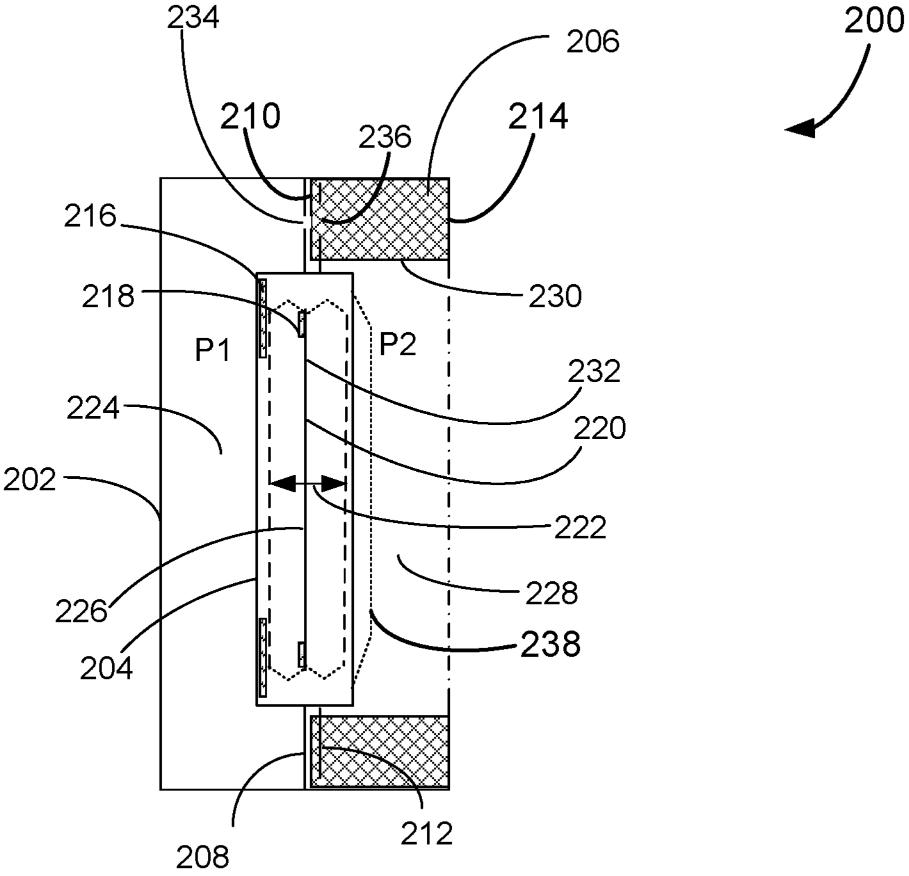
FIG. 2 shows an example audio reproduction device, according to an example of this disclosure.

Now, referring to FIG. 2, an example audio reproduction device 200 of this disclosure is described. The audio reproduction device 200 includes a housing 202, a driver assembly 204, and a ear cushion 206. The driver assembly 204 is disposed within the housing 202, using a driver plate 208. For example, one or more fasteners are used to attach the driver plate 208 to the housing 202. The ear cushion 206 is attached to the housing 202 about a first end 210 using a cushion holder 212. For example, one or more fasteners are used to attach the cushion holder 212 to the housing 202. A second end 214 of the ear cushion 206 is configured to interface with a human's head to surround the ear and provide a reasonably airtight seal.

As one skilled in the art appreciates, the audio reproduction device 200 may be a stereo audio reproduction device, which will have a housing with associated parts for the left ear and another housing with associated parts for the right ear. As one skilled in the art appreciates, the construction of the portion of the audio reproduction device 200 for use with the left ear may be similar to the construction of the portion of the audio reproduction device 200 for use with the right ear.

The driver assembly 204 includes a field magnet 216, a voice coil 218 and a diaphragm 220. The diaphragm 220 is attached to the voice coil 218. As well understood in the art, audio signals are passed through the voice coil 218, wherein the magnetic field created by the audio signals flowing through the voice coil 218 interacts with the magnetic field of the field magnet 216 to selectively move the voice coil 218 relative to the field magnet 216. This creates a selective vibration of the diaphragm 220 to reproduce the sound represented by the audio signal. For example, the diaphragm 220 moves in and out, as shown by arrow 222.

A housing chamber 224 is defined by portions of the driver assembly 204 and inside of the housing 202. The housing chamber 224 is disposed behind the back side 226 of the diaphragm 220. Pressure inside the housing chamber 224 is designated as P1. Pressure P1 varies as the diaphragm 220 moves in and out as shown by arrow 222. The ear cushion 206 surrounds the diaphragm 220. An ear chamber 228 is defined by portions of the driver assembly 202 and inner side 230 of the ear cushion 206. The ear chamber 228 is disposed in front of the front side 232 of the diaphragm 220. Pressure inside the ear chamber 228 is designated as P2. Pressure P2 varies as the diaphragm 220 moves in and out as shown by arrow 222. As one skilled in the art appreciates, the ear cushion 206 interfaces with a human's head to surround the ear and provide a reasonably airtight seal.

As the diaphragm 220 moves into the ear chamber 228, the pressure P2 in the ear chamber 228 increases and pressure P1 in the housing chamber 224 decreases. Similarly, when the diaphragm 220 moves into the housing chamber 224, the pressure P1 in the housing chamber 224 increases and the pressure P2 in the ear chamber 228 decreases. In this disclosure, the increased pressure P1 in the housing chamber 224 is selectively released. This feature will be further explained below in detail.

At least one port 234 is disposed in the driver plate 208. One end of the port 234 opens into the housing chamber 224 and extends through the driver plate 208. Other end of the port 234 is adjacent to the first end 210 of the ear cushion 206. When the diaphragm 220 moves into the housing chamber 224, the pressure P1 in the housing chamber 224 increases and the increased pressure in the housing chamber 224 is selectively released through the port 234.

In one example, by selectively releasing the increased pressure in the housing chamber 224, the diaphragm 220 can move freely into the housing chamber 224, as resistance from the back pressure built up due to increased pressure P1 is reduced.

In one example, by selectively releasing the increased pressure in the housing chamber 224 into the ear cushion 206, there is no need to provide any venting holes. By not having the venting holes, the sound from the audio reproduction device will not bleed into the surrounding space.

In one example, a cutout 236 is formed in the cushion holder 212. The cutout 236 is formed adjacent to the port

234 disposed in the driver plate. When the pressure increases in the housing chamber 224 and released through the port 234, the pressure wave travels through the ear cushion 206 from the first end 210 to the second end 214 of the ear cushion 206.

In some examples, increased pressure around the second end 214 of the ear cushion 206 improves the interface between the ear cushion 206 and the human wearing the audio reproduction device.

In some examples, the pressure wave travels through the ear cushion 206 and impinges on portion of the human head adjacent to the cushion 206, around the second end 214. This generates an additional vibration felt by the human wearing the audio reproduction device. In some examples, this additional vibration is more pronounced at low frequency of the reproduced sound.

In some examples, the release of positive and negative pressure P1 results in an improved frequency response curve, contributing to the perception of more natural low frequency, or bass, sounds.

The port or ports 234 may be one or a plurality of holes or openings of any shape, and may be located at various locations in the cushion bracket 212.

In one example, a cover 238 is disposed over the diaphragm 220. The cover 238 protects the diaphragm 220 from any external contamination and the like. The cover 238 may be a grill or a fabric or a combination of a grill with a fabric. In one example, the cover 238 may be visible through the opening in the ear cushion 206 which forms part of the ear chamber 228. Additional functions and features of the cover 238 will be later described in detail.

Figure 3:
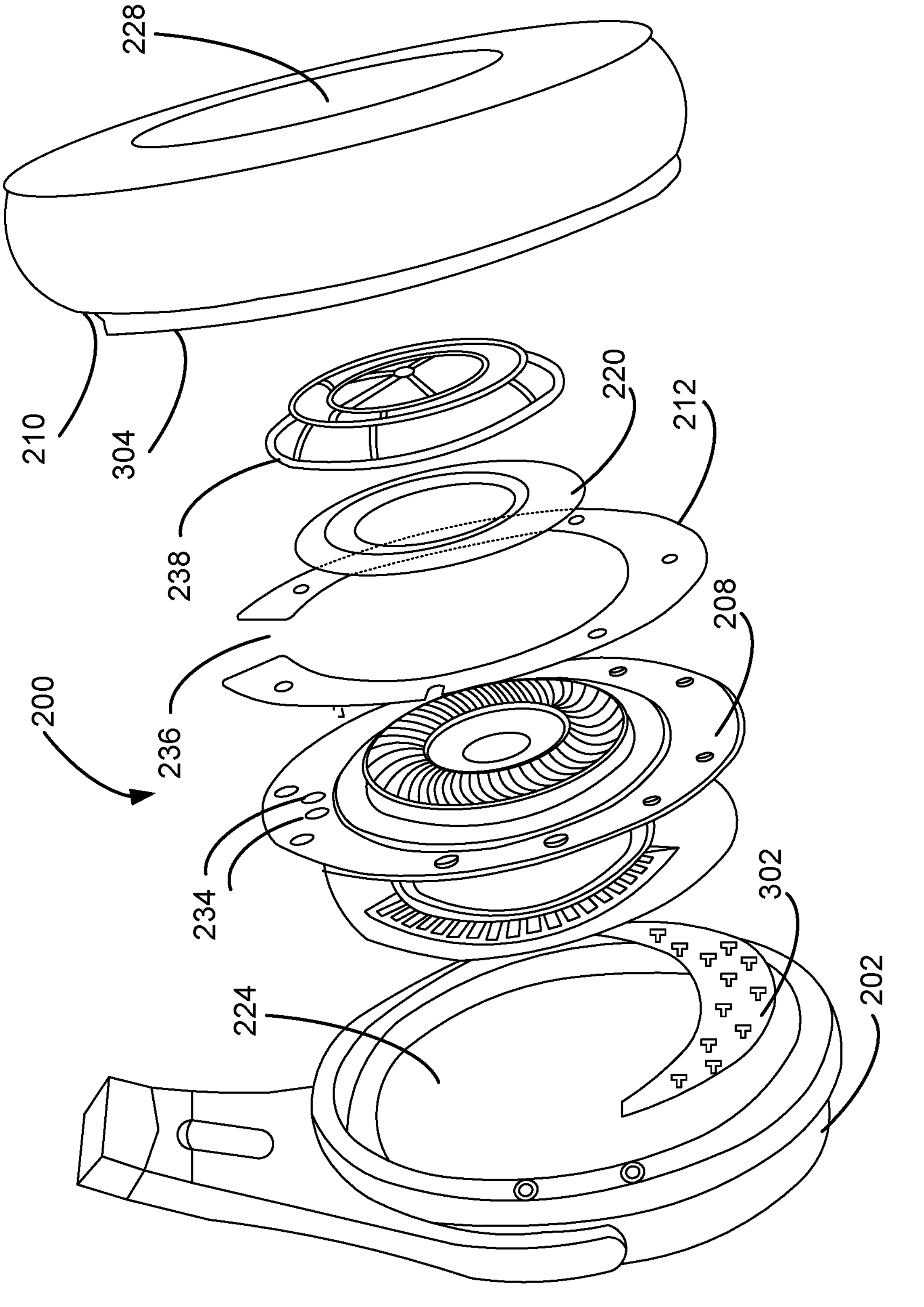
FIG. 3 shows a partial exploded view of the audio reproduction device of FIG. 2, according to an example of this disclosure.

FIG. 3 shows a partial exploded view of the audio reproduction device 200. FIG. 3 further highlights some of the features already described with reference to FIG. 2. For example, FIG. 3 shows the port 234 disposed in the driver plate 208. In this example, there are two ports 234. FIG. 3 also shows the cutout 236 in the cushion holder 212. Additionally, an electronic board 302 of the audio reproduction device 200 is also shown. As one skilled in the art appreciates, the electronic board 302 receives an audio input signal for reproduction, processes or enhances the audio input signal and feeds the audio input signal to the voice coil. Ear cushion 206 further includes a pocket 304 disposed about the first end 210 and configured to slip into and wrap around the edges of the cushion holder 212. FIG. 3 further shows the housing 202, housing chamber 224, diaphragm 220, ear chamber 228 and the cover 238.

Figure 3A:
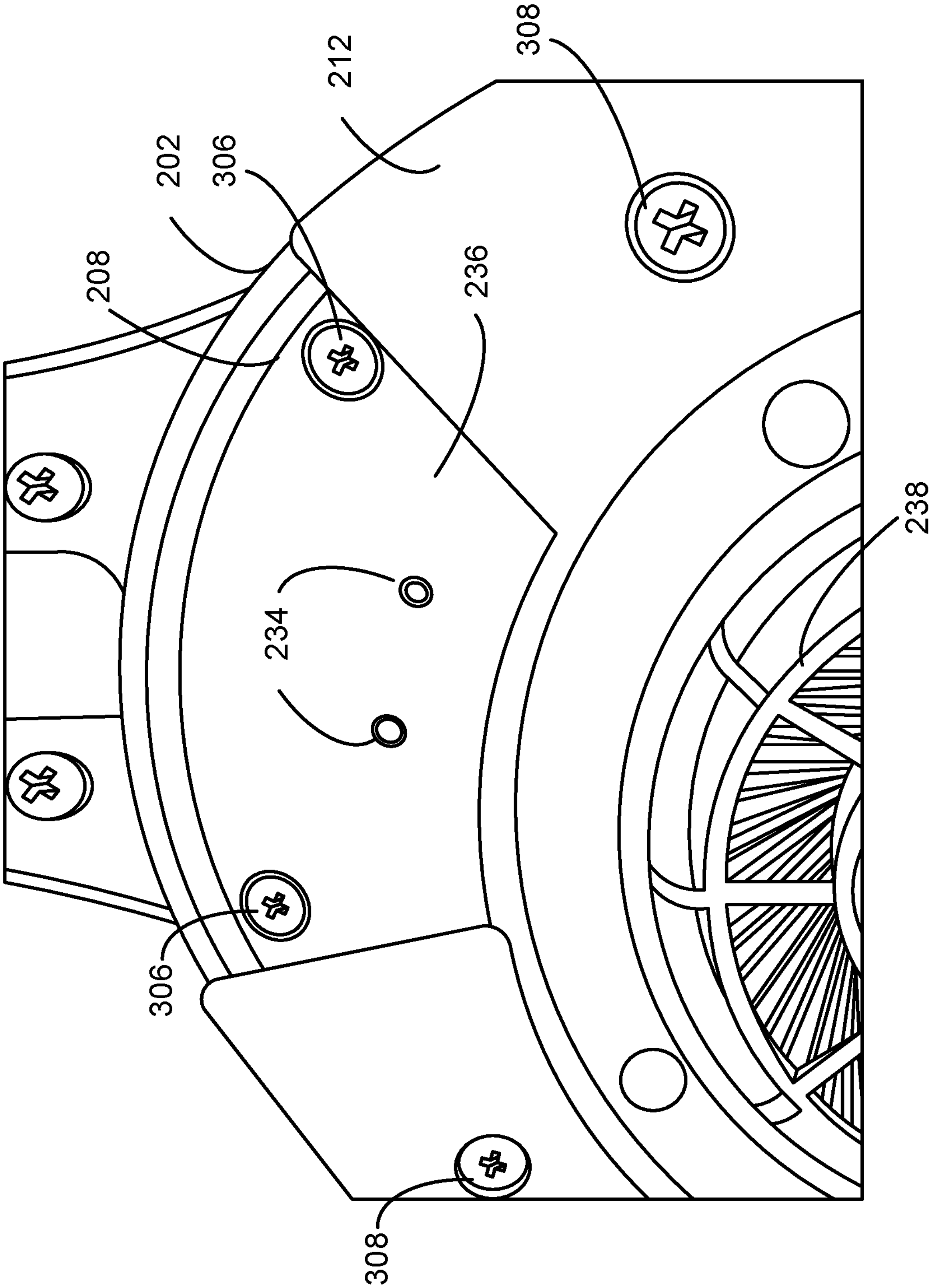
FIG. 3A shows another partial view of the audio reproduction device of FIG. 2, according to an example of this disclosure.

FIG. 3A shows another partial view of the audio reproduction device 200. In FIG. 3A, the driver plate 208 is attached to the housing 202 using a plurality of screws 306. The cushion holder 212 is also attached to the housing 202 using another plurality of screws 308. Plurality of ports 234 in the driver plate 208 and cut out 236 in the cushion holder 212 are also shown. The ports 234 in this example is round, but may be any shape including but not limited to squares, slots, or crescents. Further, the cover 238 is also shown.

As one skilled in the art appreciates, a stereo audio reproduction device 200 will have a housing with associated driver assembly for the left ear and another housing with associated driver assembly for the right ear. The housing 202, driver assembly 204 with diaphragm 220 and the cover 238 associated with the left ear is shown in FIG. 3. The housing 202 may sometimes be referred to as a left housing, the driver assembly 202 may sometimes be referred to as a left ear driver assembly and the diaphragm 220 may sometimes be referred to as a left ear diaphragm.

Figure 3B:
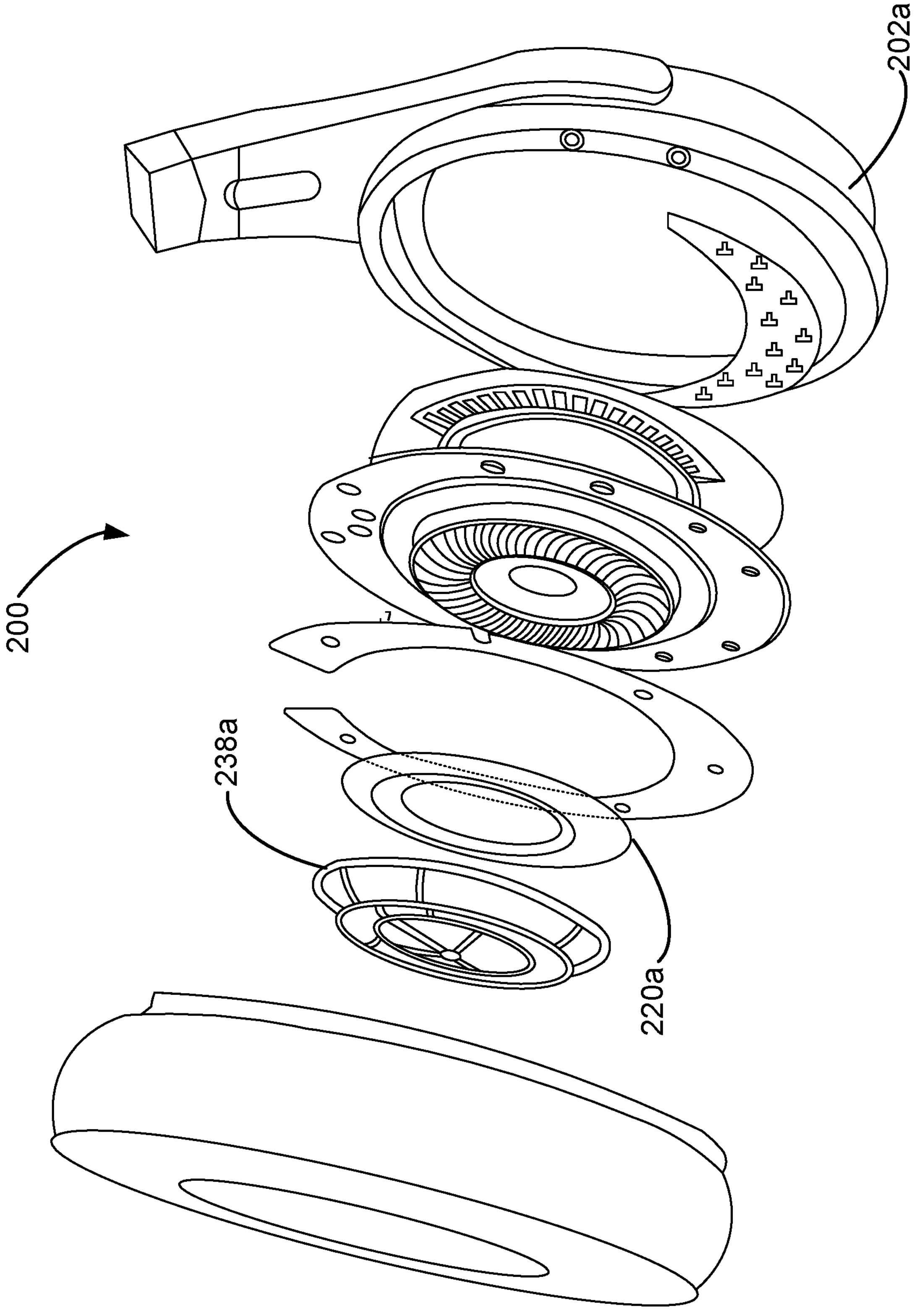
FIG. 3B shows yet another partial exploded view of the audio reproduction device of FIG. 2, according to an example of this disclosure.

Referring now to FIG. 3B, audio reproduction device 200 is shown with another housing **202*a*, another driver assembly with diaphragm 220*a* and another cover 238*a*, all associated with the right ear. As one skilled in the art appreciates, the construction of the portion of the audio reproduction device 200 for use with the left ear may be similar to the construction of the portion of the audio reproduction device 200** for use with the right ear.

In one example, the cover for the diaphragm for one of the ears may be advantageously marked to distinguish the driver assembly for one of the ears with the driver assembly for another one of the ears. In one example, a color of the cover 238 over the left ear diaphragm 220 may be different than the color of the cover **238*a* over the right ear diaphragm 220*a*. In one example, the color of the cover 238*a* over the right ear diaphragm 220*a* may be red or a shade of red. In one example, this may suggest that the housing with a red cover 238*a* is for right ear. In one example, the color of the cover 238 over the left ear driver assembly may be something other than red or a shade of red, for example, white or black. In some examples, the cover 238*a* may have an indicia "R" to indicate the right ear driver assembly and the cover 238 may have an indicia "L" to indicate the left ear driver assembly. The cover 238 may be a grill mechanism as shown in FIG. 3**B, or it may be a fabric or other material covering, or a combination of the above.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. An audio reproduction device, including:

a housing;

a driver assembly including a diaphragm, wherein the diaphragm selectively vibrates based on a received audio input signal, the diaphragm having a front side and a back side, the driver assembly disposed in the housing, selective portion of the housing and the driver assembly defining a housing chamber, the housing chamber disposed behind the back side of the diaphragm;

an ear cushion disposed in the housing, the ear cushion surrounding the diaphragm, selective portion of the ear cushion configured to form an ear chamber, the ear chamber disposed in front of the front side of the diaphragm; and at least one port disposed adjacent to the ear cushion, a portion of the ear cushion surrounding the at least one port, and the at least one port configured to communicate with the housing chamber and selectively relieve pressure from the housing chamber and into the ear cushion, when the diaphragm selectively vibrates, wherein, the ear cushion including a first end and a second end opposite to the first end;

a portion of the first end of the ear cushion surrounds the at least one port and the pressure relieved from the housing chamber travels through the ear cushion from the first end to the second end of the ear cushion.

2. The audio reproduction device of claim 1, further including:

a driver plate, the driver plate configured to couple the driver assembly to the housing and the at least one port is selectively disposed on the driver plate.

3. The audio reproduction device of claim 1, further including a cushion holder, the cushion holder configured to selectively hold a portion of the ear cushion adjacent to the at least one port.

4. The audio reproduction device of claim 1, further including a cover, the cover disposed in the ear chamber and configured to protect the diaphragm.

5. The audio reproduction device of claim 1, wherein the audio reproduction device is a stereo device with a left housing with a left ear driver assembly configured to be placed over a left ear of a listener and a right housing with a right ear driver assembly configured to be placed over a right ear of the listener, the left housing further including a first cover, the first cover disposed in a left ear chamber and the right housing further including a second cover, the second cover disposed in a right ear chamber, wherein, the first cover is different than the second cover distinguishing the placement of the left ear driver assembly over the left ear of the listener and right ear driver assembly over the right ear of the listener.

6. The audio reproduction device of claim 5, wherein the first cover is of a first color and the second cover is of a second color.

7. The audio reproduction device of claim 6, wherein the second color is substantially red.

8. The audio reproduction device of claim 5, wherein an indicia is disposed over the first cover and another indicia is disposed over the second cover to distinguish the placement of the left ear driver assembly over the left ear of the listener and right ear driver assembly over the right ear of the listener.

9. The audio reproduction device of claim 8, wherein the indicia disposed over the first cover is indicative of left and the another indicia disposed over the second cover is indicative of right.

* * * * *